United States Patent
Carlson et al.

(10) Patent No.: US 6,499,064 B1
(45) Date of Patent: Dec. 24, 2002

(54) METHOD OF USING DECOUPLED CHAIN OF RESPONSIBILITY

(75) Inventors: Brent Carlson, Rochester, MN (US); Neil Patterson, Worcester (GB)

(73) Assignee: International Business Machines Corporation, Armonk, NY (US)

(*) Notice: Subject to any disclaimer, the term of this patent is extended or adjusted under 35 U.S.C. 154(b) by 67 days.

(21) Appl. No.: 09/038,352

(22) Filed: Mar. 11, 1998

(Under 37 CFR 1.47)

(30) Foreign Application Priority Data

Aug. 14, 1997 (EP) .............................................. 97114040

(51) Int. Cl.$^7$ ................................................ G06F 9/46
(52) U.S. Cl. ...................................... 709/316; 709/318
(58) Field of Search ................... 709/300, 303, 709/310, 315, 316; 395/701

(56) References Cited

U.S. PATENT DOCUMENTS 5,936,860 A * 8/1999 Arnold et al. ................. 700/95

OTHER PUBLICATIONS

Gamma et al. "Design Patterns", Oct. 1995.*
(GAMMA) Gamma, Erich. "Design Patterns, Elements of Reusable Object–Oriented Software", Oct. 1995.*
U.S. patent application Ser. No. 08/927,944, Kathy Bohrer et al., "Property Container Type Objects", filed Sep. 11, 1997.

* cited by examiner

Primary Examiner—St. John Courtenay, III
Assistant Examiner—Lewis A. Bullock, Jr.
(74) Attorney, Agent, or Firm—Owen J. Gamon; Roy W. Truelson

(57) ABSTRACT

A method of developing a software system using Object Oriented Technology. The present invention addresses the problem of providing a technical foundation for the development of software applications using Object Oriented Technology and frameworks. The present invention solves this problem with a framework supporting flexible interchange of domain algorithms. The present invention is applicable in the technical field of application development of software systems, e.g. for a business application as Financial or Logistic and Distribution, wherein it is the purpose of frameworks to provide significant portions of the application that are common across multiple implementations of the application in a general manner, easy to extend for specific implementation.

6 Claims, 3 Drawing Sheets

METHOD OF USING DECOUPLED CHAIN OF RESPONSIBILITY

The present application is related to the following commonly assigned co-pending applications filed on the same date as the present application, each of which is herein incorporated by reference:

U.S. Ser. No. 09/038,024 by Kathryn Bohrer et al., entitled "A Method of Developing a Software System Using Object Oriented Technology";

U.S. Ser. No. 09/038,351 by James Carey et al., entitled "Framework for Business Applications Providing Financial Integration";

U.S. Ser. No. 09/038,349 by James Carey et al., entitled "Framework for Business Applications Using Cached Aggregate and Specification Key";

U.S. Ser. No. 09/038,025 by James Carey et al., entitled "Software Business Objects in a Multilevel Organizational Structure";

U.S. Ser. No. 09/041,114 by Brent Carlson et al., entitled "Method of Error Handling in a Framework", now issued as U.S. Pat. No. 6,052,525;

U.S. Ser. No. 09/038,381 by Anders Nilsson, entitled "A Method of Locating Software Objects in Different Containers".

FIELD OF THE INVENTION

The present invention relates to a method of developing a software system using Object Oriented Technology and frameworks, in particular relates to a method for providing a framework supporting flexible interchange of domain algorithms.

DESCRIPTION OF THE RELATED ART

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem. Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non object oriented ways of developing software, Object Oriented Technology comprises and uses preengineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library". A class library is simply a collection of several classes stored together in a special filing format called a library.

In Object Oriented Technology an "object" is a self-contained piece of software consisting of related data and procedures. Data means information or space in a computer program where information can be stored, e.g. a name or an inventory part number. Procedures are parts of a program that cause the computer to actually do something, e.g. the parts of a program which perform calculations or the part of a program that stores something on a computer disk. In Object Oriented Technology, an object's procedures are called "methods".

The concept of an object being a self-contained piece of software having data and procedures inside itself is a new way of developing software. In non object oriented software, most of the data for an entire program is often grouped together near the beginning of the program, and the procedures then follow this common pool of data. This conventional method worked okay for smaller programs, but as soon as a piece of software started to grow and become somewhat complex, it become increasingly difficult to figure out which procedures were using which data. This made it quite difficult and expensive to debug or change traditional software programs.

In Object Oriented Technology it is generally easier to debug, maintain, and enhance object oriented software. The three most popular object oriented programming languages are probably "C++", "JAVA", and "Smalltalk". The concept that both data and methods are contained inside an object is called "encapsulation". Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used to communicate the concept that one object can inherit part of its behavior and data from another object, e.g. since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g. whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, maintenance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology the term "framework" is used to describe a reusable set or collection of classes which work together to provide a commonly needed piece of functionality not provided by any of the individual classes inside the framework. Thus a framework defines a specific way in which multiple objects can be used together to perform one or more tasks which no single object performs. In other words, a framework is a reusable, predefined and preengineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper". Frameworks can be regarded as an group of software objects which contain a technical foundation for a software application. For example in the business field of Financial, Logistic and Distribution or Production. Although a framework represents a skeleton of a software application, usually a framework is not an executable software program.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore applications have to provide integrated solutions with respect to installed software.

In particular, frameworks need to support flexible interchange of domain algorithms so that application developers and end users can easily configure a business object with specific behavior. In many cases, a default behavior that can be overridden at multiple levels is desirable. For example, the default algorithm used to identify a stock location within a warehouse, where a product is to be retrieved from, may be defined on the company object within the framework but may be overridden for a specific combination of product and warehouse, a specific warehouse, or a specific product.

A software application developer may want to change the path, or may want to allow the end user to select one of many possible paths, used to retrieve an overriding algorithm for a specific business object instance. In addition, the application developer may want to improve the performance of the framework, or allow the end user to do so, by bypassing the override retrieval mechanism. The developer may want to apply both of these optional behaviors to some or all of the objects in his application.

Known from the prior art, see e.g. E. GAMMA et al: "Design Patterns: elements of reusable object-oriented software", Addison-Wesley, 1995, ISBN 0-201-63361-2, are two object oriented design patterns, "Chain of Responsibility" and "Strategy". The Strategy pattern defines a mechanism to supply multiple replacable algorithms within an object oriented design but the Strategy pattern in isolation is insufficiently flexible as it does not enable the ability to selectively override algorithms on a per-object basis. The Chain of Responsibility pattern provides this ability to override a domain algorithm. In its standard form, however, the Chain of Responsibility is fixed and is defined through direct linkage between the objects in the chain.

Within the accompanying figures, representation standards for classes, objects, relationships etc. are used at least partly according to Grady Booch: "Object-Oriented Analysis and Design with Applications", second edition, The Benjamin/Cummings Publishing Company, Ind., Redwood City, Calif., USA.

SUMMARY OF THE INVENTION

It is an object of the present invention to provide a technical foundation for the development of software applications using Object Oriented Technology which overcomes the above discussed problems.

It is a further object of the present invention to provide a framework supporting flexible interchange of domain algorithms.

It is a further object of the present invention to provide a framework which allows the modeling of businesses with a multiple level organizational structure.

The present invention solves this object with methods and apparatus as layed down in enclosed independent claims. Particular embodiments of the present invention are presented in the respective dependent claims.

In particular, the present invention provides a framework to be used for developing a software system, e.g. for a business application, said framework using the concept of a Chain of Responsibility design pattern, characterized in that said Chain of Responsibility design pattern concept is abstracted so that a separate class hierarchy defines a set of encapsulated Chains of Responsibility. This has the advantage that the Chain of Responsibility is not limited to objects which are directly linked to each other. Furthermore it is advantageous, that multiple independently defined chains can be implemented and selected on a per-object basis. Thus, the invention supports all of the above requirements relating to flexible interchange of domain algorithms in an efficient and flexible manner.

Objects in the retrieval path do not directly hold instances of Strategy objects as attributes. Instead, these objects are held as properties within an object's Property Container, as described in the patent application "Property Container Type Objects", filed with the European Patent Office, application number 96117940.5. The Chain of Responsibility implementations are thus not limited to using instances of those classes which were defined by the framework to directly hold Strategy objects. This gives the application developer a great deal of flexibility in defining their own retrieval algorithms, including using other framework defined classes and also classes which the application has introduced assuming these application classes are defined to support the Property Container.

In a particular embodiment of the invention the Chain of Responsibility class hierarchy is also implemented using the Strategy pattern so that any one of the alternative retrieval algorithms may be associated with a domain object. In a further particular embodiment, the Strategy class representing the domain algorithm is itself a subclass of the Chain of Responsibility base class, and the Chain of Responsibility's base class public interface directly exposes the domain algorithm's Interface. This allows a domain object to be configured with a specific algorithm retrieval implementation, providing a more flexible behavior, or directly with a specific algorithm providing a faster run-time behavior. Such flexibility is crucial in a framework which must allow software application developers to tailor specific applications to widely disparate requirements sets and operating environments.

DETAILED DESCRIPTION

Figure 1:
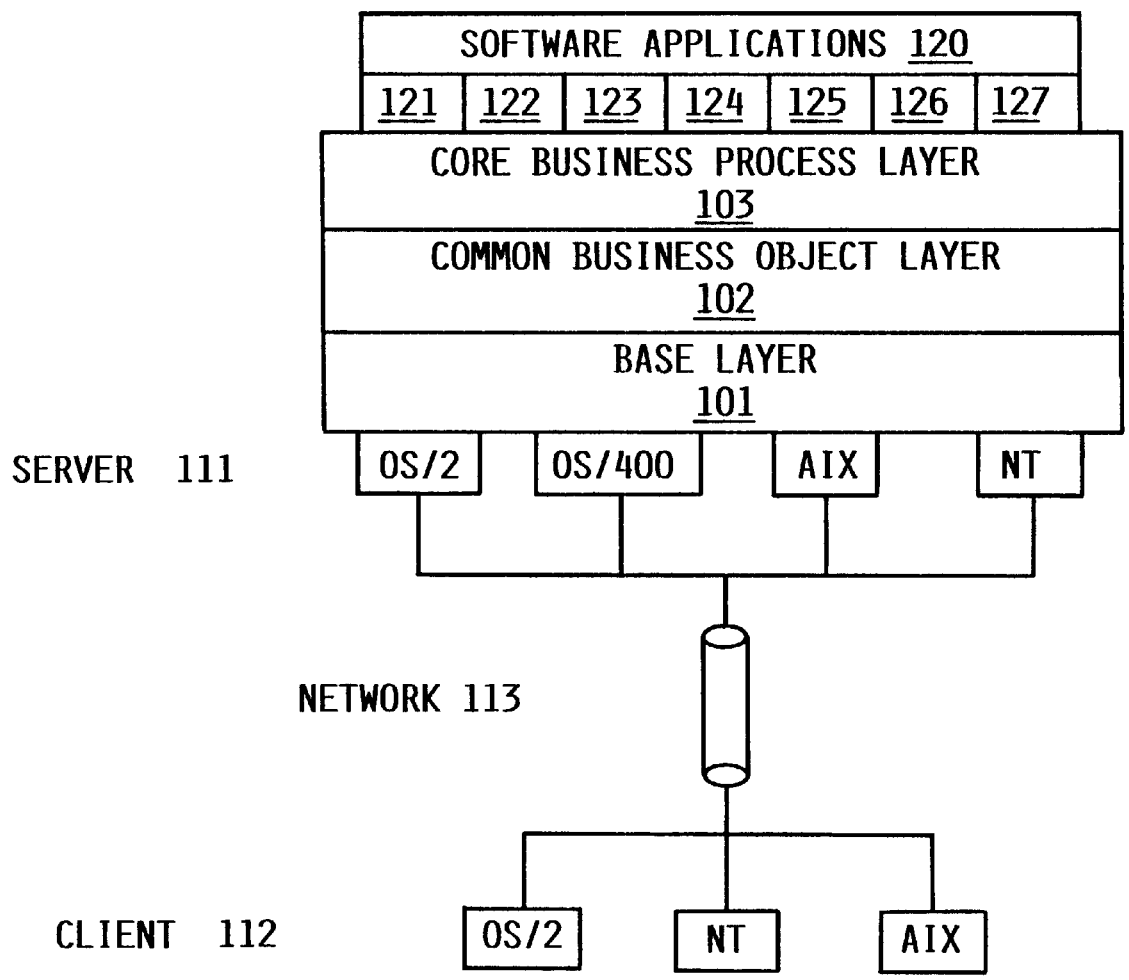
FIG. 1 shows a four layer schema from which software application can be developed using the present invention.

Developing software applications using the subject of the present invention as a development tool can be regarded as built up of four layers as shown in FIG. 1.

The lowest layer is the base layer 101. The base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure form the software application developer. The Base layer 101 can be regarded as a kind of lower middleware necessary for the application of the Object Technology above it using the interface functionality provided by the Base layer 101.

Above the Base layer 101 there is a layer comprising Common Business Objects 102. This Common Business Object layer 102 provides a large number of objects which perform functions commonly needed within a business application, e.g. date and time, currency, address, units of measure, and calendar. These Common Business Objects represent the building blocks from which software application developers can select and create business applications, e.g. these Common Business Objects can be copied and extended to perform new functions as for example the date and time object can be extended to handle the Chinese calendar.

The layer 103 above the Common Business Objects layer 102 already comprises Core Business Processes and can be regarded as the Core Business Process layer 103. Although this layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which—although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g. Warehouse Management. The resulting framework is constructed in a way to contain commonly used functions as well as to be easy to extend.

On top of the above described three layer model the application software is located, created by the software application developer and representing executable code. It is the choice of a software application developer whether to use only the base layer 101, the base layer 101 and the Common Business Object layer 102, or all three layers 101, 102, and 103 for the development of his software application. In every case he has to develop a remaining part of the application by himself and therefore every resulting software application program will be a completely unique product.

It has to be noted that the subject of the present invention is represented within the three layer model 101, 102, and 103 and is not represented by the executable code of the software application 121 developed using the present invention.

In a framework one of the things needed is the ability to change algorithms easily, particularly in a business application framework, because often a business application is modified even on a customer site. An application may provide different options, e.g. different algorithms for calculating something or such as product availability or determining which location in a warehouse to put incoming goods. For example three or four different versions may be provided with the application delivered which are acceptable for most customer uses of the application, but sometimes customers have special needs and thus the framework has to be modified on the customer site. The present invention provides a flexible way to replace algorithms not only across the entire application but for specific pieces of the application. The "location selection" option is used as an example of an embodiment of the present invention by the following.

For each warehouse represented in the application, potentially a different location selection algorithm might be wanted. However, for the particular company the application is representing, a standard location selection algorithm might be wanted to be defined. The application would be built and shipped with the standard algorithm installed in the application and the end user, as he defines his warehouse in the application, indicates as an option during defining his warehouse whether he want to change the location selection algorithm. When the algorithm has to be changed, a menu with different location selection algorithms comes up, one of them is selected and installed for this particular warehouse.

Figure 2:
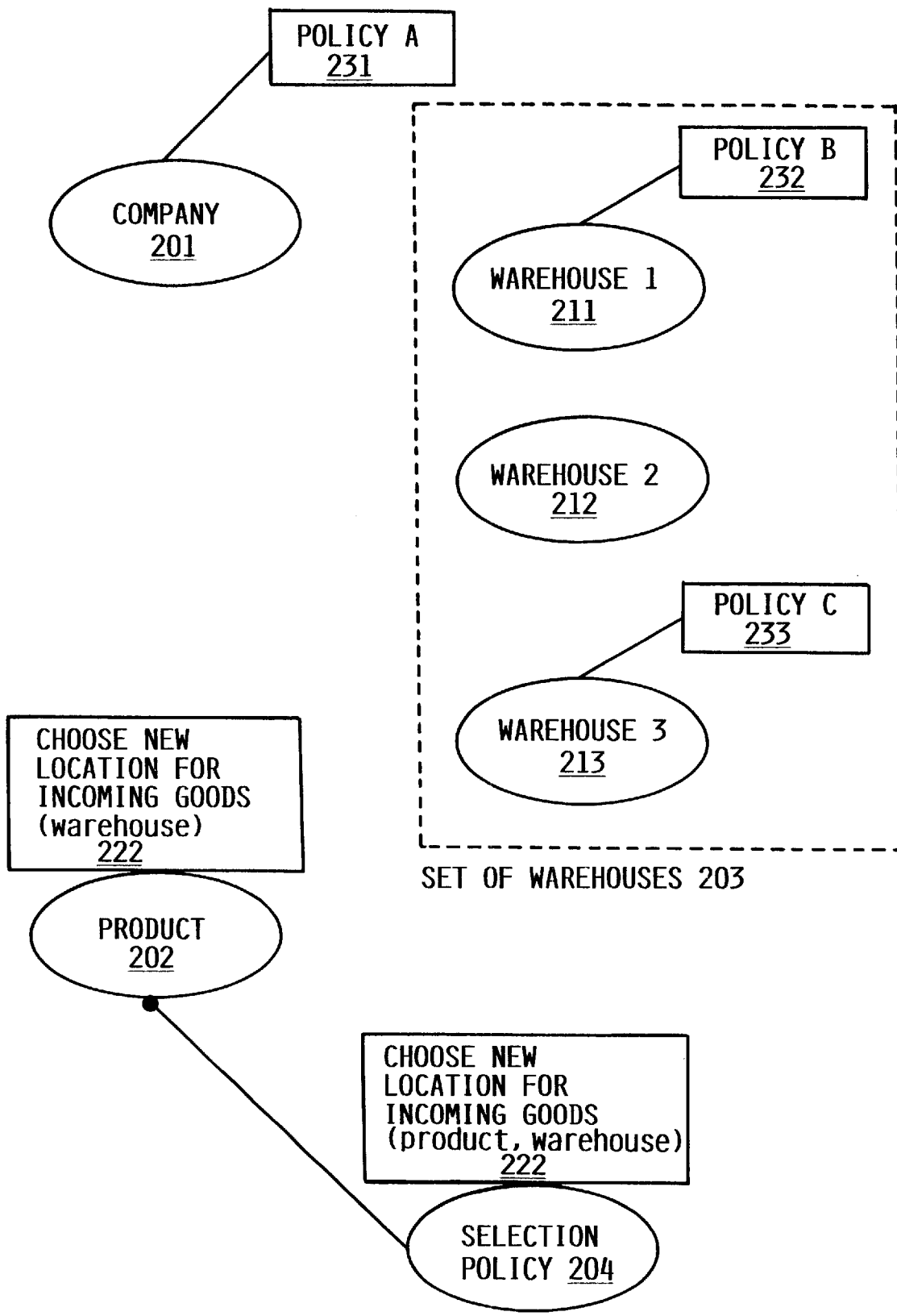
FIG. 2 shows an example for the location selection algorithm with two levels of hierarchy.

FIG. 2 shows an example for the location selection algorithm with only two levels of hierarchy, the company with the default behavior and the warehouses with the overriding behavior. The concept can be extended to any number of levels necessary for an specific application depending on the business needs. There is a company object 201, a product object 202, and a set 203 of warehouse objects, warehouse one 211, warehouse two 212, and warehouse three 213. With the product 202 there is provided a method 222 "choose new location for incoming goods"

which is associated with a specific product and with "warehouse" as a parameter. For different products like frozen goods or pharmaceuticals there might be different algorithms. On the company object 201 a policy 231 which has the default behavior is associated and this policy 231 is held as a property of the company object 201.

The property gives great flexibility in adding attributes dynamically. A property container interface supports the dynamic adding of references to other objects ("properties") to an existing object. An object added as a property to a property container type object may be either an "owned" object that shares the same lifecycle as the owning object, or "unowned" in which case the referenced object has a lifecycle independent of the referencing object. These properties are keyed by a string "property ID" that is used by clients of the object to reference the given property. To implement the property container interface a base class is introduced which contains a dictionary style collection that contains the property ID: property pairs as well as a flag indicating whether or not the property is owned.

The product 202 itself holds a selection policy 204 which supports the choose-interface 222 as well, modified to pass the product as an additional parameter (this is a standard strategy pattern). The responsibility of the selection policy is to go through a chain of responsibility being defined for it and to determine which policy is the correct policy. With the company 201, a policy A 231 is introduced, with warehouse one 221, a policy B 232 is introduced, and with warehouse three 213, a policy C 233 is introduced. There is no policy introduced with warehouse two 212. The selection policy recognizes warehouse three as the parameter of the choose-method, goes to warehouse three 213 and asks warehouse three 213 whether it has a policy of this type or not. Since warehouse three 213 has a policy of this type, the selection policy 204 replaces the company policy A 231 by the warehouse specific policy C 233 of warehouse three 213. If warehouse two 212 is recognized as the parameter of the choose-method 222, the request of the selection policy results in no specific policy of this type and the default policy A 231 is maintained for warehouse two 212.

Figure 3:
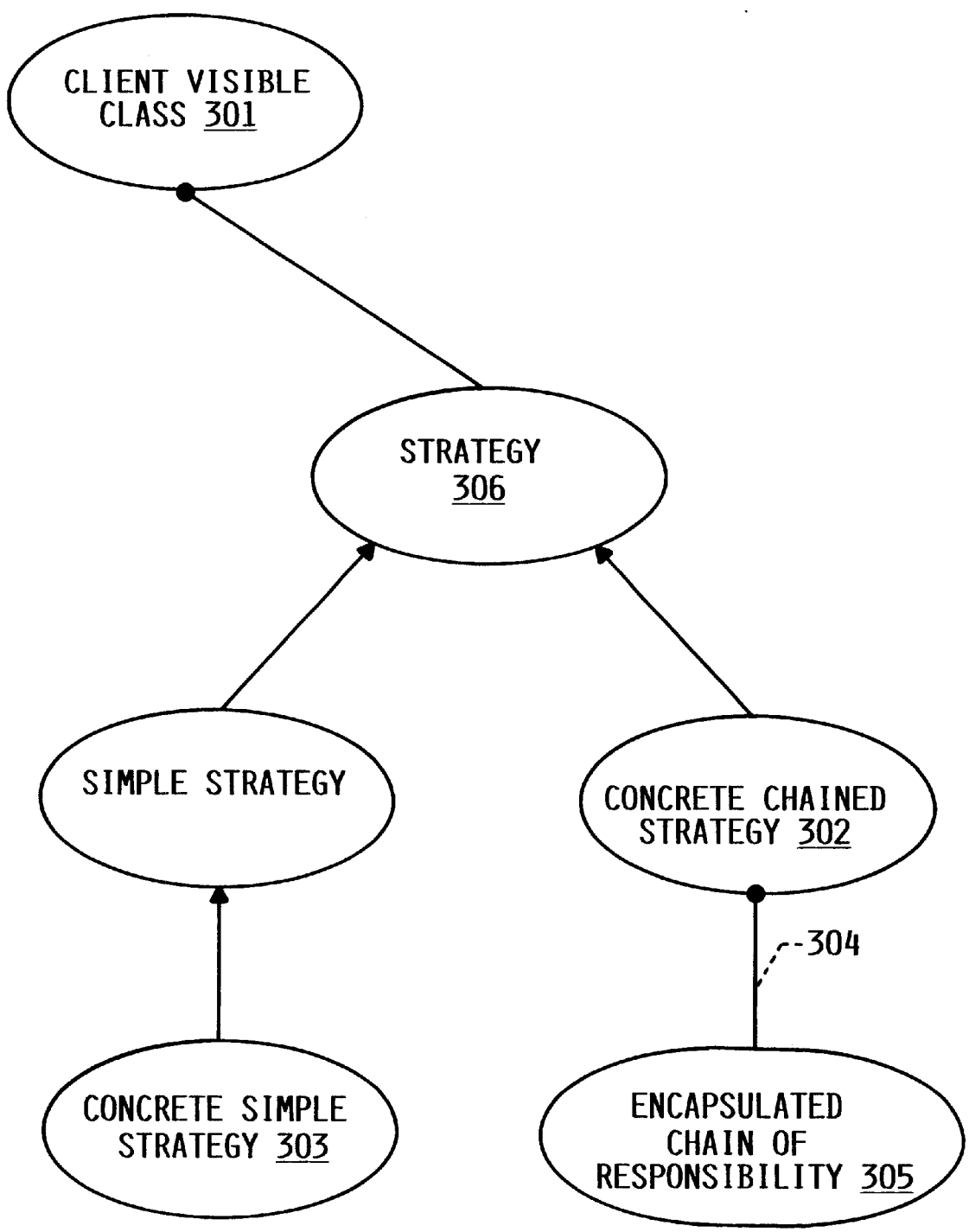
FIG. 3 shows a class representation of the chain of responsibility driven strategy.

FIG. 3 shows a class representation of the chain of responsibility driven strategy. The client visible class 301 (analogous to the product 202 in FIG. 2) can be configured with either a concrete chained strategy 302 or a concrete simple strategy 303, because both types of classes support the strategy interface 306. This allows the application developer or user to tune a particular client visible class instance 301 for performance, when using a concrete simple strategy 303, or for flexibility, when using a concrete chained strategy 302. Policy instances held as properties, e.g. policy B 232 in FIG. 2, may be instances of concrete chained strategy 302, thus providing even greater flexibility. This flexibility can be extended indefinitely, although with corresponding reductions in performance. The relationship 304 between the concrete chained strategy 302 and an encapsulated chain of responsibility 305 may vary based on the actual usage, for example concrete chained strategy 302 implements encapsulated chain of responsibility 305 directly, or concrete chained strategy 302 holds one or more encapsulated chain of responsibility 305 objects, or concrete chained strategy 302 refers to one or more encapsulated chain of responsibility 305 objects held by property on other objects.

To address all of the sharing requirements according with the allowance of modeling of businesses with a multiple level organizational structure mentioned above, an abstract controller class is defined to present the common methods defined for the access of the controlled business objects. The interface presented by this abstract class is used by clients to access business objects from a controller. Two concrete subclasses of controllers are derived from this abstract controller class.

The first, called a "root" controller, is a controller that holds a collection of business objects and provides methods for creating and deleting business objects in that collection. Only those business objects in the root controller's collection can be accessed through this controller. Thus, when a company keeps a set of BOs in a root controller it is isolating itself from its parent's set (if one exists).

The second concrete subclass is an "aggregating" controller. Like the root controller, an aggregating controller holds a collection of business objects that it controls itself, but unlike the root controller, it has access to a "parent" controller which may be either a root or another aggregating. When business objects are accessed through an aggregating controller, the controller first checks its own collection for the requested business object (business objects are usually identified with a unique ID which is used to key them within the controller structure). If the requested business object is found there it is returned, if not the parent controller is retrieved and asked to return the requested business object. This behavior will repeat until the requested business object is found or until a root controller is encountered. This behavior allows an aggregating controller to appear to a client to have a "logical" scope that includes the business objects that it controls directly as well as those in its chain of parent controllers. The aggregating controller is also able to "override" a parent's business object with a matching one (matching unique ID) in its own collection.

A specialization of the aggregating controller is a subclass known as a "hiding" controller. In addition to providing all functionality of the aggregating controller, the hiding controller maintains a collection of business objects held by parent controllers that it wishes to "hide", typically by unique ID. When a business object with a given ID is requested from a hiding controller, the controller first checks its collection of "hidden" objects. If the object is found there, the controller indicates to the client that the requested business object is not found. If the object is not in the hidden object collection, it will be retrieved in the normal aggregating controller fashion. Hiding controllers allow a child company to hide specific business objects in the parent company's set while sharing others.

The type of recursive search used by aggregating controllers is a use of the "Chain of Responsibility" pattern (see E. GAMMA et al: "Design Patterns: elements of reusable object-oriented software", Addison-Wesley, 1995, ISBN 0-201-63361-2). In the case of aggregating controllers the links of the chain are not direct. Instead, an aggregating controller accesses its parent by first going to its associated company (for which a direct link is held), acessing the parent company through the organizational tree structure of companies, and then using the property container interface of the parent company to request the parent controller, This modelling of the relationship between parent and child controllers allows controllers to be added, removed or changed at any level of the organizational structure without adversely affecting controllers at other levels, i.e. requiring aggregating controllers at lower levels to rebuild parent controller links when a new controller is added to a to a company between it and its current parent controller.

What is claimed is:

1. A framework used within an object oriented programming environment for developing a software system, said framework comprising:

a plurality of encapsulated chains of responsibility, each of said encapsulated chains of responsibility being an instance of an abstract chain of responsibility base class, each of said encapsulated chains of responsibility implementing a respective domain algorithm; and a strategy interface to a plurality of strategy classes, each of said strategy classes implementing a respective domain algorithm, wherein a first strategy class of said plurality of strategy classes implements a first of said plurality of encapsulated chains of responsibility to implement the domain algorithm of the first chain of responsibility, and wherein a second strategy class of said plurality of strategy classes implements a concrete simple strategy implementing a domain algorithm.

2. The framework of claim 1, further comprising:

a root controller class, said root controller class being an instance of an abstract controller class, said root controller class holding a first plurality of business objects and providing methods for said plurality of business objects; and at least one aggregating controller class, said aggregating controller class being an instance of said abstract controller class, said aggregating controller class having at least one parent class which is also an instance of said abstract controller class, said aggregating controller class holding a second plurality of business objects, wherein said aggregating controller class implements said domain algorithm of said first of said plurality of chains of responsibility by, in response to a method call identifying an object, returning the identified object if the object is one of the second plurality, and if not, requesting the identified object from said parent.

3. The framework according to claim 1, wherein said chain of responsibility's base class public interface directly exposes said domain algorithm's interface.

4. The framework according to claim 1, wherein a chain of responsibility class is associated with a business object and implements a portion of said business object's function.

5. The framework according to claim 4, wherein said chain of responsibility class attempts to retrieve a strategy class from various business objects until a strategy class instance is found.

6. The framework according to claim 5, wherein said retrieved strategy class may itself be a chain of responsibility class.

\* \* \* \* \*